United States Patent
Aljishi

(10) Patent No.: US 11,867,048 B2
(45) Date of Patent: Jan. 9, 2024

(54) METHOD AND SYSTEM BASED ON QUANTIFIED FLOWBACK FOR FORMATION DAMAGE REMOVAL

(71) Applicant: SAUDI ARABIAN OIL COMPANY, Dhahran (SA)

(72) Inventor: Mohammad K. Aljishi, Alqatif (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 133 days.

(21) Appl. No.: 17/491,477

(22) Filed: Sep. 30, 2021

(65) Prior Publication Data
US 2023/0099449 A1     Mar. 30, 2023

(51) Int. Cl.
*E21B 47/005*     (2012.01)
*G01V 99/00*     (2009.01)
*E21B 47/07*     (2012.01)

(52) U.S. Cl.
CPC ............ *E21B 47/005* (2020.05); *E21B 47/07* (2020.05); *G01V 99/005* (2013.01); *E21B 2200/20* (2020.05)

(58) Field of Classification Search
CPC .... E21B 47/005; E21B 47/07; E21B 2200/20; G01V 99/005
See application file for complete search history.

(56) References Cited

U.S. PATENT DOCUMENTS

| | | | |
|---|---|---|---|
| 9,176,252 B2 | 11/2015 | Liang et al. | |
| 9,507,047 B1* | 11/2016 | Dvorkin | G01V 5/101 |
| 2002/0188431 A1* | 12/2002 | Ding | E21B 43/00 |
| | | | 703/10 |
| 2017/0153358 A1 | 6/2017 | Hansen | |
| 2018/0017697 A1* | 1/2018 | Fouda | E21B 49/08 |
| 2020/0302678 A1* | 9/2020 | Miao | G01V 3/20 |
| 2021/0096277 A1 | 4/2021 | Zaki et al. | |

OTHER PUBLICATIONS

Ribeiro, Marilea, "New approach to calculate the mud invasion in reservoirs using well logs", SBGf, 2013 (Year: 2013).*
Ribeiro, Marilea et al., "A New Approach To Calculate Mud Invasion in Reservoirs Using Well Logs"; Brazilian Journal of Geophysics; vol. 32, No. 2; pp. 215-223; 2014 (9 pages).

* cited by examiner

*Primary Examiner* — Catherine T. Rastovski
*Assistant Examiner* — Yossef Korang-Beheshti
(74) *Attorney, Agent, or Firm* — Osha Bergman Watanabe & Burton LLP

(57) ABSTRACT

A method may include obtaining a real-time petrophysical data derived from a plurality of well logs during drilling and utilizing the real-time petrophysical data to quantify a formation damage profile using a resistivity tornado chart and a wellbore modeling. The method further includes utilizing the resistivity tornado chart to determine a depth of invasion inside a formation at each depth in a wellbore by using ratios between different resistivity logs obtained while drilling and creating a synthetic wellbore model by using a fluid flow equation for the wellbore modeling and calculating a time-specific invasion profile to determine a condition at a flowback time. The method further includes performing a computational fluid dynamics investigation in order to identify invaded fluid flow characteristics from the formation to the wellbore and calculating a duration needed to flowback an obtained invaded volume for removal of the formation damage based on a fluid flow behavior.

17 Claims, 5 Drawing Sheets

METHOD AND SYSTEM BASED ON QUANTIFIED FLOWBACK FOR FORMATION DAMAGE REMOVAL

BACKGROUND

Formation damage is a widely spread concerning issue that newly drilled wells face due to drilling fluids invasion impeding production and injection. Various enhancement operations are used to restore potential of well from the formation damage, for example, a well lifting and a matrix acidization. However, such operations might lead to multiple issues, for example, an additional cost of a rig time or even rig less operations, an increase in overall cost of drilling, and a risk prone treatment that might result into reducing the productivity and injectivity.

Flowback is a common technique used to leave the drilling fluid in the wellbore and enhance the performance of the well. However, the current practice is to flow the well back blindly without a scientific basis to determine the required duration of such operation. Accordingly, there is a need of an enhancement of flowback operation to identify the damage profile based on scientific analysis leading to optimize operation duration and overall cost.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for formation damage removal based on quantified flowback. The method includes obtaining a real-time petrophysical data derived from a plurality of well logs during drilling. The method further includes utilizing the real-time petrophysical data to quantify a formation damage profile using a resistivity tornado chart and a wellbore modeling. The method further includes utilizing the resistivity tornado chart to determine a depth of invasion inside a formation at each depth in a wellbore by using ratios between different resistivity logs obtained while drilling. The method further includes creating a synthetic wellbore model by using a fluid flow equation for the wellbore modeling and calculating a time-specific invasion profile to determine a condition at a flowback time. The method further includes performing a computational fluid dynamics investigation in order to identify invaded fluid flow characteristics from the formation to the wellbore. The method further includes calculating a duration needed to flowback an obtained invaded volume for removal of the formation damage based on a fluid flow behavior near the wellbore.

In another aspect, embodiments disclosed herein generally relate to a system that includes a drilling system and a logging system coupled to the drilling system which include a plurality of drill bit logging tools. The system further includes a control system coupled to a plurality of sensors. The system further includes a reservoir simulator that includes a computer processor. The reservoir simulator is coupled to the logging system and the drilling system. The reservoir simulator obtains a real-time petrophysical data derived from a plurality of well logs during drilling. The reservoir simulator utilizes the real-time petrophysical data to quantify a formation damage profile using a resistivity tornado chart and a wellbore modeling. The reservoir simulator utilizes the resistivity tornado chart to determine a depth of invasion inside a formation at each depth in a wellbore by using ratios between different resistivity logs obtained while drilling. The reservoir simulator creates a synthetic wellbore model by using a fluid flow equation for the wellbore modeling and calculates a time-specific invasion profile to determine a condition at a flowback time. The reservoir simulator performs a computational fluid dynamics investigation in order to identify invaded fluid flow characteristics from the formation to the wellbore. The reservoir simulator calculates a duration needed to flowback an obtained invaded volume for removal of the formation damage based on a fluid flow behavior near the wellbore.

In another aspect, embodiments disclosed herein generally relate to a non-transitory computer readable medium storing instruction. The instructions are executable by a computer processor and include functionality for obtaining a real-time petrophysical data derived from a plurality of well logs during drilling. The instruction further includes utilizing the real-time petrophysical data to quantify a formation damage profile using a resistivity tornado chart and a wellbore modeling. The instruction further includes utilizing the resistivity tornado chart to determine a depth of invasion inside a formation at each depth in a wellbore by using ratios between different resistivity logs obtained while drilling. The instruction further includes creating a synthetic wellbore model by using a fluid flow equation for the wellbore modeling and calculating a time-specific invasion profile to determine a condition at a flowback time. The instruction further includes performing a computational fluid dynamics investigation in order to identify invaded fluid flow characteristics from the formation to the wellbore. The instruction further includes calculating a duration needed to flowback an obtained invaded volume for removal of the formation damage based on a fluid flow behavior near the wellbore.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

Figure 1:
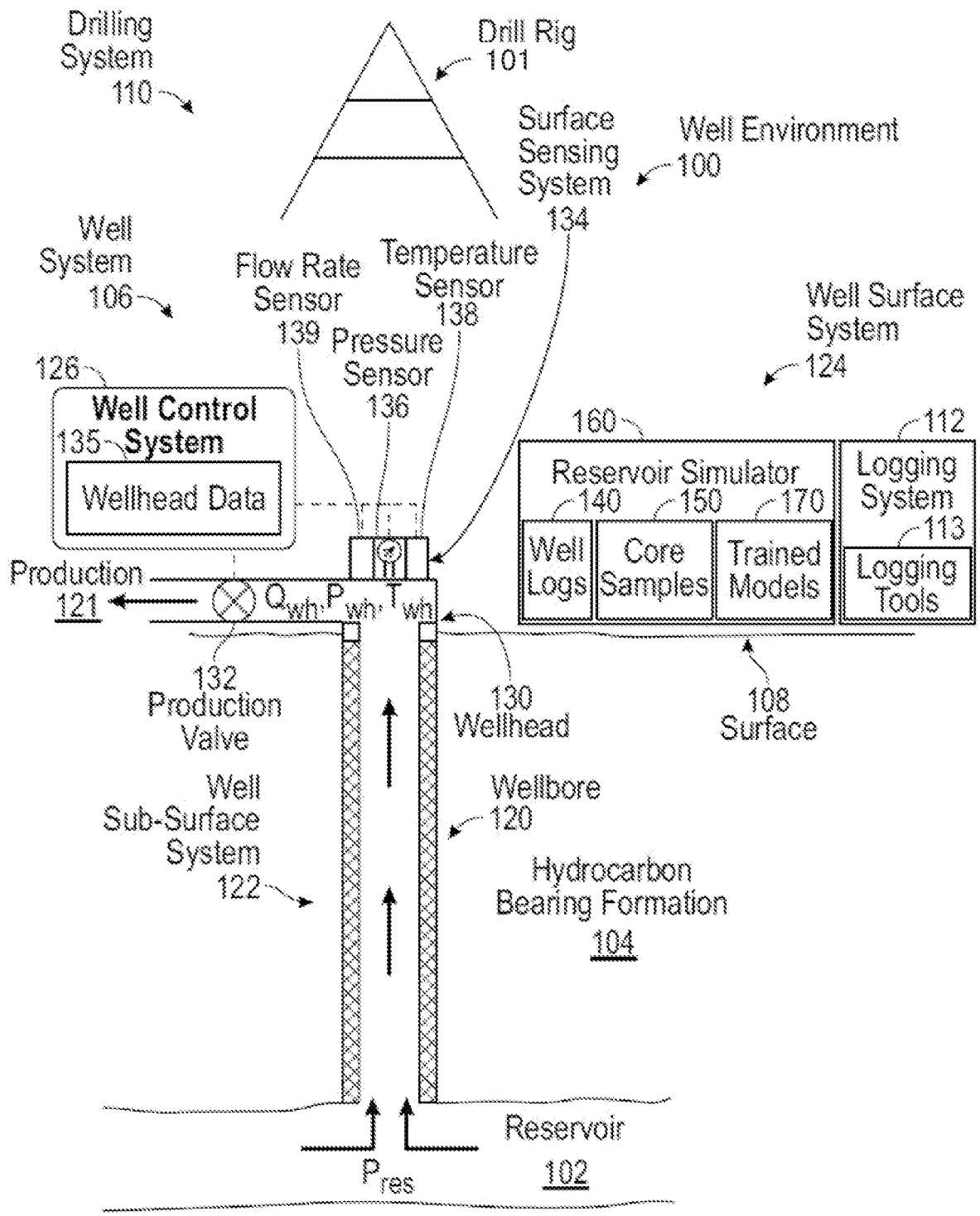
FIG. 1 shows a system in accordance with one or more embodiments.

Specific embodiments of the disclosure will now be described in detail with reference to the accompanying figures.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

Flowback is a common technique used to leave the drilling fluid in the wellbore and enhance the performance of the well. However, the flowback is usually performed with slight or no regard to the invasion and formation damage profile in the wellbore and the operation is executed blindly until formation fluid is seen on surface without knowing whether the formation in conduits have been cleared fully prior to shutting the well. Nevertheless, such multiple logs obtained from such operation may help in quantifying the volume of invasion around the wellbore and ultimately determine the required duration of the job. However, such operation may lead to an additional cost of a rig time or even rig less operations, an increase in overall cost of drilling, and a risk prone treatment that might result into reducing the productivity and injectivity.

In general, one or more embodiments are directed to a multi-step methodology for flowback operations to intelligently quantify and calculate the magnitude of occurred damage and efficiently determining the durations of such operation to optimize operation duration and overall cost. In particular, the method starts with an initial screening process until computing the time needed to flow the well rather than focusing on a single step of utilizing resistivity inversion and fluid flow analysis. In addition, the well lifting and flowback operation are performed by utilizing petrophysical data to identify the damage profile which can be used as an optimization method by understanding the nature of the damage and can lead to a more enhanced well cleaning results and ultimately helps in optimizing overall cost.

In particular, embodiments disclosed herein may incorporate the utilization of multiple well logs including a density-neutron porosity, a permeability, and a nuclear magnetic resonance (NMR) log as a vital step to determine invasion-critical zones, to indicate porosity obtained during the drilling, and understand lithological features simultaneously with resistivity logs which may contribute to understanding porosimetry and voids distribution leading to obtain the most probably depths to contains invaded fluids pockets. Furthermore, the method may incorporate core data, well testing and fluid saturation studies for data correlation and process enhancement prior to calculating the invasion profile.

The density-neutron porosity is the safest porosity output from logs if rock matrix and fluids are uncertain. The density and neutron tools usually deviate from true porosity in opposite directions as the fluid content or the rock matrix varies. The permeability is a measure of the ability of a porous medium to transmit fluid. Reservoir rocks must be both porous and permeable. The permeability is dependent on fluid viscosity, pressure gradient, grain size, sorting and distribution, pore size and pore throat size, tortuosity, clay content and distribution, cementation, and presence or absence of fractures. Absolute permeability is the permeability of the formation when only one fluid is present in the pore spaces. Effective permeability is the permeability to one fluid in the presence of another fluid. Relative permeability is the ratio of the effective permeability to the absolute permeability. A NMR logging tool is used for 3D profiling at multiple depths of investigation of the wellbore for simultaneous multifrequency measurements. A single pass of the NMR logging tool in the wellbore provides total and effective porosity, permeability, and fluid identification and characterization.

Embodiments of the invention may be used in invasion profiling which consists of computing the depth of invasion and true formation resistivity as an initial step during drilling. In addition, the obtained profile is utilized as an input to the invasion/mud cake buildup wellbore model additionally to the mobility to calculate the invasion profile at the time of flowback. The method may further utilize computational fluid dynamics analysis to consider the interaction between the invading fluid and the existing formation fluid additionally to the fluid and solid phases interphase. The computational fluid dynamics analysis is utilized to identify and inspect invading fluid distribution knowing the contrast of solids content between mud and formation fluid while taking into consideration the precipitation of solids on wellbore wall.

Embodiments of the invention may be used in optimizing the flowback operation of all onshore and offshore rigs by quantifying the occurred damage to the formation and consequently calculating the required duration which can lead to more enhanced well cleaning results and ultimately optimized overall cost.

FIG. 1 shows a system diagram in accordance with one or more embodiments. More specifically, FIG. 1 illustrates a well environment (100) in which a monitoring system to monitor operating parameters of rig equipment may be implemented, includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

The well environment (100) may include a drilling system (110) and a logging system (112). The drilling system (110) may include a drill string, drill bit or a mud circulation system for use in boring the wellbore (120) into the hydrocarbon-bearing formation (104).

The logging system (112) may include one or more logging tools (113), such as the NMR logging tool or a resistivity logging tool, for use in generating wellhead data (135) of the formation (104). For example, a logging tool may be lowered into the wellbore (120) to acquire measurements as the tool traverses a depth interval (for example, targeted reservoir section) of the wellbore (120). The plot of the logging measurements versus depth may be referred to as a "log" or "well log." Well logs may provide depth measurements of the well system (106) that describe such reservoir characteristics as formation porosity, formation permeability, resistivity, water saturation, and the like. The resulting logging measurements may be stored or processed or both, for example, by the well control system (126), to generate corresponding well logs for the well system (106). A well log may include, for example, a plot of a logging response time versus true vertical depth (TVD) across the depth interval of the wellbore (120).

In some embodiments, the well system (106) includes a rig (101), a wellbore (120), a well sub-surface system (122), a well surface system (124), and a well control system ("control system") (126). The rig (101) is the machine used to drill a borehole to form the wellbore (120). Major components of the rig (101) include drilling fluid tanks, drilling fluid pumps (e.g., rig mixing pumps), a derrick or mast, draw works, a rotary table or top drive, a drill string, a power generation equipment called a rig engine and an auxiliary equipment. There may be more than one rig engine associated with a single rig (101). The rig (101) uses torque converters, clutches, and transmissions powered by its own diesel engines.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, the control system (126) may control various operations of the well system (106), such as well production operations, well completion operations, well maintenance operations, and reservoir monitoring, assessment, and development operations. The control system (126) may include hardware or software for managing drilling operations or maintenance operations. For example, the control system (126) may include one or more programmable logic controllers (PLCs) that include hardware or software with functionality to control one or more processes performed by the drilling system (110). Specifically, a programmable logic controller may control valve states, fluid levels, pipe pressures, warning alarms, or pressure releases throughout a drilling rig. In particular, a programmable logic controller may be a ruggedized computer system with functionality to withstand vibrations, extreme temperatures (for example, ~575° C.), wet conditions, or dusty conditions, for example, around the rig (101). Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. In some embodiments, the control system (126) includes a computer system that is the same as or similar to that of computer system (500) described below in FIGS. 5A and 5B and the accompanying description.

In some embodiments, sensors may be included in the well control system (126) that includes a processor, memory, and an analog-to-digital converter for processing sensor measurements. For example, the sensors may include acoustic sensors, such as accelerometers, measurement microphones, contact microphones, and hydrophones. Likewise, the sensors may include other types of sensors, such as transmitters and receivers to measure resistivity or gamma ray detectors. The sensors may include hardware or software or both for generating different types of well logs (such as acoustic logs or sonic longs) that may provide data about a wellbore on the formation, including porosity of wellbore sections, gas saturation, bed boundaries in a geologic formation, fractures in the wellbore or completion cement. If such well data is acquired during drilling operations (that is, logging-while-drilling), then the information may be used to make adjustments to drilling operations in real-time. Such adjustments may include rate of penetration (ROP), drilling direction, and altering mud weight.

In some embodiments, the well sub-surface system (122) includes casing installed in the wellbore (120). For example, the wellbore (120) may have a cased portion and an uncased (or "open-hole") portion. The well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature, and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the measurements are recorded in real-time, and are available for review or use within seconds, minutes or hours of the condition being sensed (e.g., the measurements are available within 1 hour of the condition being sensed). In such an embodiment, the wellhead data (135) may be referred to as "real-time" wellhead data (135). Real-time wellhead data (135) may enable an operator of the well system (106) to assess a relatively current state of the well system (106) and make real-time decisions regarding development of the well system (106) and the reservoir (102), such as on-demand adjustments in regulation of production flow from the well.

In some embodiments, the well control system (126) through the logging system (112) collects and records wellhead data (135) for the well system (106) and may generate datasets of dynamic data based on the collected wellhead data (135).

In some embodiments, the well system (106) is provided with a reservoir simulator (160). For example, the reservoir simulator (160) includes hardware and/or software with functionality for analyzing well log data and/or performing one or more reservoir simulations. For example, the reservoir simulator (160) may store well logs (140) and data regarding core samples for performing simulations. The reservoir simulator (160) may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. The reservoir simulator (160) may include hardware or software with functionality for generating one or more trained models regarding the formation (104). For example, the reservoir simulator (160) may store well logs (140) and data regarding core samples (150), and further analyze the well log data, the core sample data, seismic data, or other types of data to generate or update the one or more trained models (170) having a complex geological environment. For example, different types of models may be trained, such as machine learning, artificial intelligence, convolutional neural networks, deep neural networks, support vector machines, decision trees, inductive learning models, deductive learning models, and supervised learning models, and are capable of approximating solutions of complex non-linear problems. The reservoir simulator (160) may couple to the logging system (112) and the drilling system (110).

In some embodiments, the reservoir simulator (160) may include functionality for applying machine learning and deep learning methodologies to precisely determine various subsurface layers. To do so, a large amount of interpreted data may be used to train a model. To obtain this amount of data, the reservoir simulator (160) may augment acquired data for various geological scenarios and drilling situations. For example, drilling logs may provide similar log signatures for a particular subsurface layer except where a well encounters abnormal cases. Such abnormal cases may include, for example, changes in subsurface geological compositions, well placement of artificial materials, or various subsurface mechanical factors that may affect logging tools. As such, the amount of well data with abnormal cases available to the reservoir simulator (160) may be insufficient for training a model. Therefore, in some embodiments, the reservoir simulator (160) may use data augmentation to generate a dataset that combines original acquired data with augmented data based on geological and drilling factors. This supplemented dataset may provide sufficient training data to train a model accordingly.

In some embodiments, the reservoir simulator (160) is implemented in a software platform for the well control system (126). The software platform may obtain data acquired by the drilling system (110) and logging system (112) as inputs, which may include multiple data types from multiple sources. The software platform may aggregate the data from these systems (110, 112) in real time for rapid analysis. Real-time of or relating to computer systems in the software platform is defined as the actual time for updating information with instantaneous processing at the same rate as required by a user or necessitated by a process being controlled. In some embodiments, the well control system (126), the logging system (112), or the reservoir simulator (160) may include a computer system that is similar to the computer system (500) described with regard to FIGS. 5A and 5B and the accompanying description.

This invention aims towards curing the formation damage near-wellbore caused by drilling fluid invasion through utilizing a systematic process to quantify the duration and volume needed to return the formation to its original state. The key concept of this idea is to utilize petrophysical data derived from the different well logs obtained during drilling, i.e., resistivity, density, neutron and the calculated porosity, permeability, and lithology logs to quantify the formation damage profile with the help of a tornado chart and a wellbore modeling. Once identified, computational fluid dynamics modeling will be utilized to identify the flow behavior near-wellbore and consequently quantify the required flowback duration to flow the invading fluids. This method will help to restore the potential of wells by cleaning flow conduits near wellbore based on a systematic flowback approach without any need of introducing acidization fluids to the wellbore.

Figure 2:
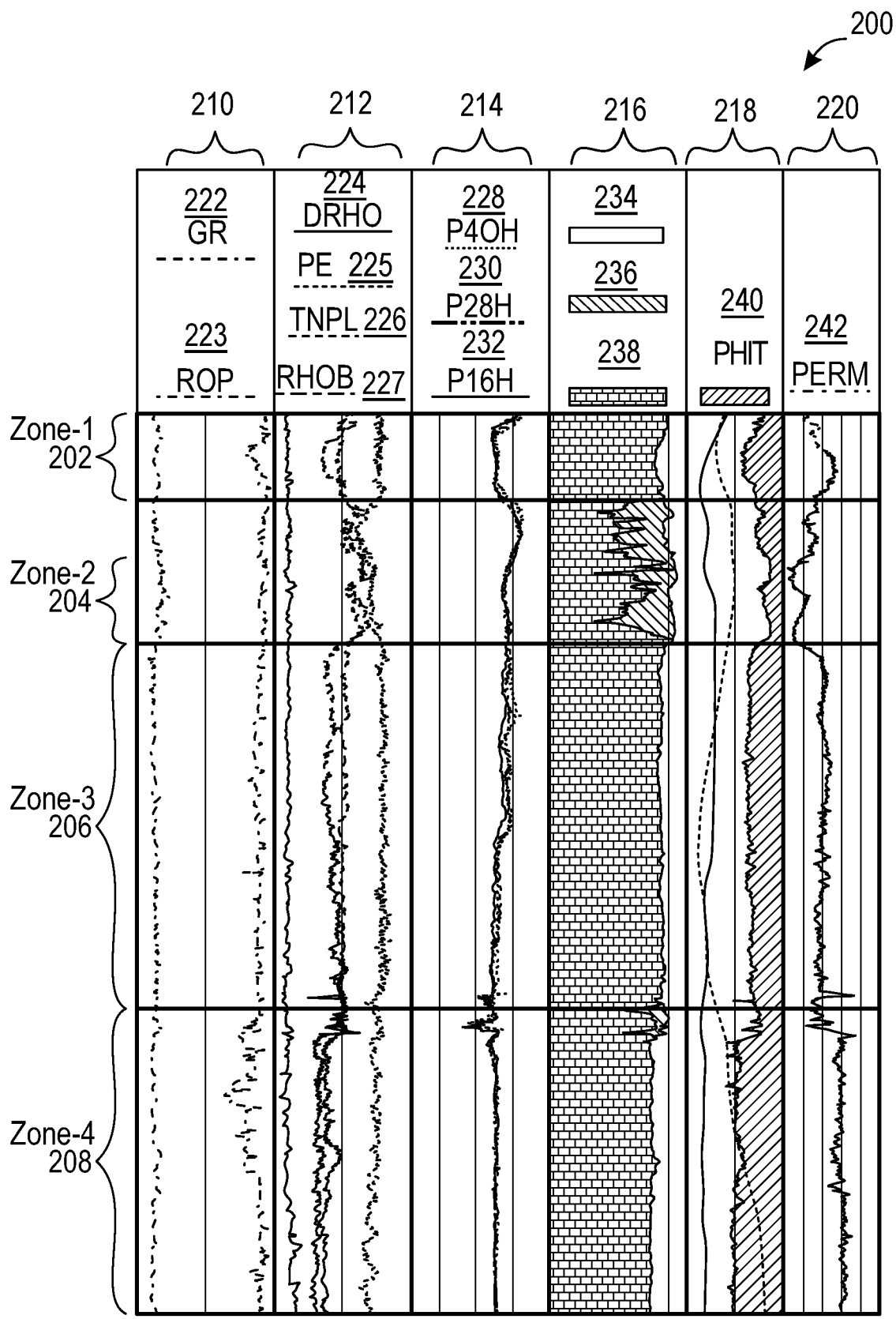
FIG. 2 shows an example of an invasion profile in accordance with one or more embodiments.

Turning to FIG. 2, FIG. 2 illustrates an example of an invasion profile (200) in accordance with one or more embodiments. In particular, the invasion profile (200) is showing contrast in rock qualities between four different zones in a same wellbore (for example, wellbore (120)). More specifically, FIG. 2 shows that a total interval is subdivided into four zones, namely, a zone-1 (202), a zone-2 (204), a zone-3 (206), and a zone-4 (208), based on log responses obtained from the well logs (140) which exemplify rock properties accordingly. In particular, the different zones show different rock qualities which correspond to different invasion profiles and volumes invading the different parts of the reservoir (102).

In some embodiments, first three columns: a first column (210), a second column (212), and a third column (214) are raw data retrieved from logging tools while the other three columns: a fourth column (216), a fifth column (218), and a sixth column (220) are interpreted petrophysical properties with the following description:

First Column (210):
GR (222): Gamma Ray
ROP (223): Rate of Penetration
Second Column (212):
DRHO (224): Density Correction curve
PE (225): Photoelectric Index
TNPL (226): Thermal Neutron Porosity or Neutron Log
RHOB (227): Bulk Density
Third Column (214):
P40H (228): Phase Shift Resistivity forty inches environmentally corrected or the Deep Resistivity Log
P28H (230): Phase Shift Resistivity twenty-eight inches environmentally corrected or the Medium Resistivity Log
P16H (232): Phase Shift Resistivity sixteen inches environmentally corrected or the Shallow Resistivity Log
Fourth Column (216):
VOL_ANHYDRA (234): Calculated volume of anhydrite in the total formation content at the current depth
VOL_DOLOM (236): Calculated volume of dolomite in the total formation content at the current depth
VOL_CALCITE (238): Calculated volume of calcite in the total formation content at the current depth
Fifth Column (218):
PHIT (240): Calculated total cross-plot porosity
Sixth Column (220):
PERM (242): Calculated permeability In addition, the different log responses at different intervals may indicate different rock and petrophysical properties as they react to the different features in the formation. Based on the general trends of the open hole logs, the entire well interval may be divided into four zones: the zone-1 (202), the zone-2 (204), the zone-3 (206), and the zone-4 (208).

Turning to the zone-1(202), a small gap between density and neutron logs is observed in the second track indicating that the formation has lower density while the neutron log is static in the middle reading higher presence of hydrogen. On the other hand, the resistivity logs are stack at a high resistivity value. In such case, it may be deduced that the zone-1(202) has good petrophysical properties as may be seen in the calculated porosity and permeability and a good presence of hydrocarbon in the zone-1(202) may be calculated by using Archie's equation:

$$S_w = [(a/\Phi^m)*(R_w/R_t)]^{(1/n)} \qquad (1)$$

$S_w$: water saturation
$\Phi$: porosity
$R_w$: formation water resistivity
$R_t$: observed bulk resistivity
a: a constant (often taken to be 1)
m: cementation factor (varies around 2)
n: saturation exponent (generally 2)

Turning to the zone-2(204), a gap is found between the density and neutron curves but on the opposite direction where density log is reading higher while the neutron log is reading lower value. Such a formation that also has a higher amount of hydrogen often represents dolomite in carbon reservoirs. A cross-plot porosity is calculated showing qualitatively lower value than the previous zone for the targeted reservoir and, in turn, correlates to lower permeability values for such reservoir. The cross-plot porosity is the porosity obtained by plotting two porosity logs against each other, normally, density and neutron porosity. The three resistivity logs (e.g., the deep resistivity log, the medium resistivity log, and the shallow resistivity log) are reading almost the same value. This indicates that no drilling mud invasion has occurred. In other words, these resistivity readings indicate that, due to poor rock properties, mud filtrate could not penetrate the wellbore wall, which indicates that the zone-2(204) is a tight formation.

Turning to the zone-3 (206), the first interval shows similar properties to the zone-1 (202) with lower density and higher neutron and lower density in a clean limestone interval with high resistivity indicating presence of light hydrocarbon in a good rock quality zone. The second part of the zone-3(206) shows lower gap between density and neutron but resulting to a good cross-plot porosity as well while there is a general reduction in resistivity indicating a presence of different fluid properties while rock properties are consistent with general good porosity and permeability.

Turning to the zone-4 (208), a general change in all log responses can be observed in all tracks. A density drop may be observed where the PERM (242) is shifting towards the left indicating higher pore sizes. Neutron log is reading lower value as well indicating lower presence of hydrogen in this interval. On the other hand, resistivity log is quite consistent with the previous zone. It may be deduced from the different logs that the reservoir is a clean carbonate reservoir with higher porosity and permeability and slightly different fluid properties than the previous zone.

In other words, these different rock properties may be used to indicate the fluid invasion and flowability at the different zones utilizing tornado charts, fluid flow equations, and wellbore modelling and thus be used as inputs to ultimately quantify the time and volume needed for flow back operations.

In one or more embodiments, the invasion profile (200) may be done using a 3D profiling tool employing the NMR measurements. This logging tool is based on the creation of a toroidal region of homogeneous radial magnetic field surrounding the wellbore at a specified distance from the center of the wellbore in the surrounding rock formation. The tool has a multifrequency main antenna designed for fluid characterization applications and two high-resolution antennas that provide rock-quality and producibility answers. A resonant radiofrequency magnetic field created by the tool produces the NMR signal in only the sensitive toroidal region. The NMR signal amplitudes obtained from the formation fluids in the toroidal region result in porosity/saturation data. Computer deconvolution of NMR signal relaxation time data yields formation pore size distribution. Other types of data (some unique) are potentially available by use of special operating modes. A single pass of this logging tool in the wellbore provides total and effective porosity, permeability, and fluid identification and characterization.

In other embodiments, the invasion profile (200) may be done using a High-Resolution Laterolog array (HRLA) tool which attacks the difficult task of resolving true formation resistivity in thinly bedded and deeply invaded formations by providing five independent, actively focused, depth- and resolution-matched measurements. These measurements, together with a 2D earth model and an inversion scheme, simultaneously account for the borehole, a shoulder-bed and invasion effects, yield a more accurate, more robust true formation resistivity-critical for identifying and estimating reserves. An array spacing is optimized to obtain the maximum amount of information about the invasion profile (200), thereby improving resistivity estimations. The tool delivers an array of five resistivities, each with increasing depth of investigation. The HRLA tool operates using six different modes ranging from the shallowest mode to the deepest mode.

In some embodiments, the array spacing is designed to supply the most information possible about the invasion profile (200). For example, in thin beds, where deeper measurements tend to degrade in both depth of investigation and vertical resolution, the HRLA service provides an array of measurements that present a clear invasion profile. The shallow readings improve the radial sensitivity to resistivity change. With minimum shoulder-bed effects, the five resistivity measurements reduce ambiguity and improve interpretations. In some embodiments, the additional information from the HRLA resistivity data allows a realistic estimate of a diameter of invasion, which in turn allows invasion corrections to be applied to find a more accurate true formation resistivity.

In some embodiments, once the data related to the different invasion profiles are obtained an invasion analysis may be performed to identify the depth and profile and eventually the initial volume of drilling fluids invaded the formation. In some embodiments, the data obtained from the core samples (150), the well log data and fluid saturation data may be utilized for studying data correlation and process enhancement prior to calculating the invasion profile.

Figure 3:
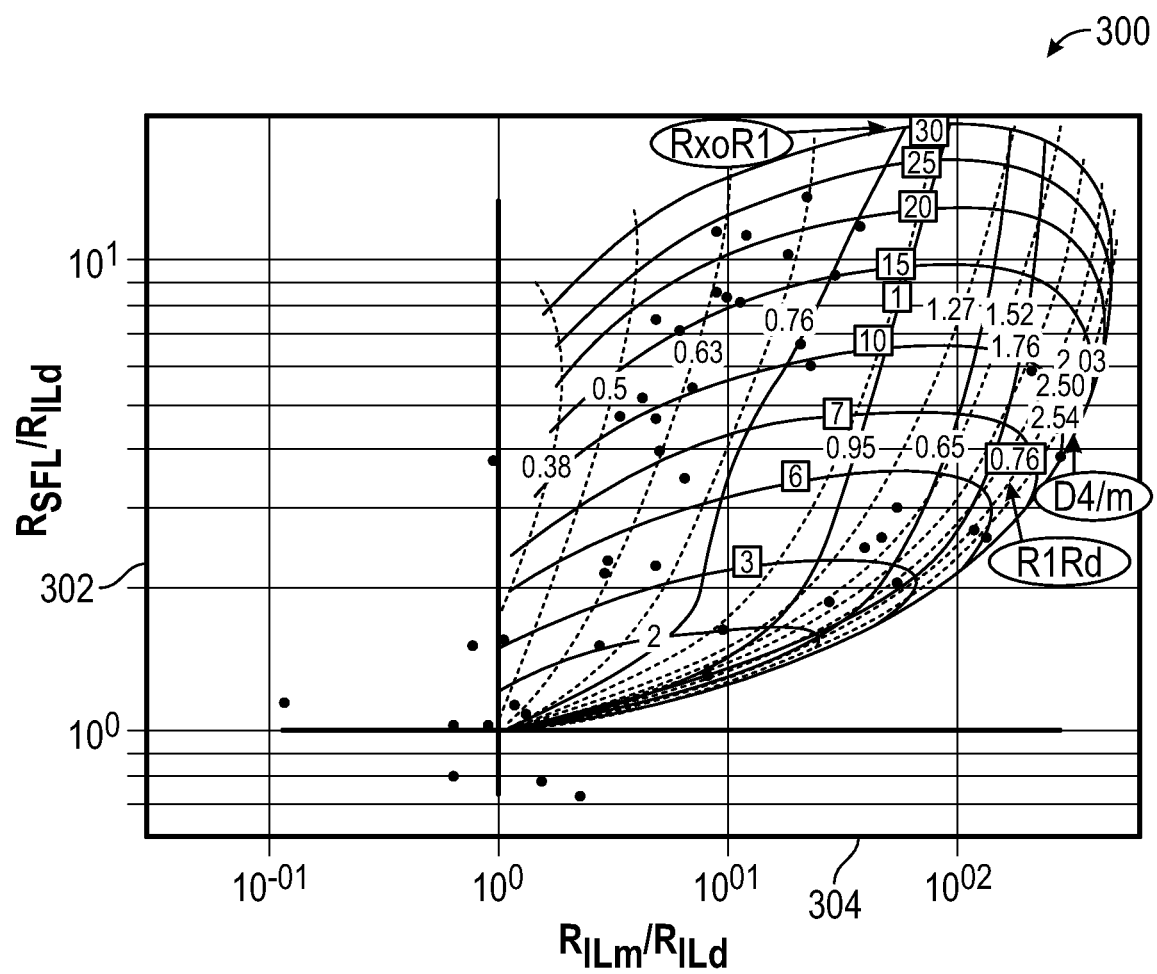
FIG. 3 shows an exemplary resistivity tornado chart in accordance with one or more embodiments.

Turning to FIG. 3, FIG. 3 illustrates an exemplary resistivity tornado chart (300) used for determining the invasion and a true resistivity specification in accordance with one or more embodiments. In particular, the resistivity tornado chart may then be utilized to determine the depth of invasion inside the formation at each depth in the wellbore by using ratios between the different resistivity logs obtained while drilling. The resistivity tornado chart represents the effect of invasion on resistivity measurements that have different depths of investigation. The chart (300) incorporated with caliper logs assumes a step-profile model of invasion and determine the true resistivity, a flushed zone resistivity and the diameter of invasion from ratios of deep-, medium- and shallow-resistivity measurements. In some embodiments, when both resistive invasion and conductive invasion are plotted, the chart is called a butterfly chart. When only one is plotted, it is known as a tornado chart.

It is worth noting that usually three resistivity logs are obtained which are further classified as shallow, medium, and deep logs measuring the resistivity at different depths of investigation. A ratio between the shallow to deep (302) is plotted on Y-axis while a ratio between medium to deep (304) is plotted on X-axis leading to computing the output which is the depth of invasion. In one or more embodiments, the obtained value may be utilized as inputs to a synthetic wellbore model to estimate a time-specific invasion profile, compute the time-specific invasion profile, and ultimately compute the volume of invaded fluids at the time of flowback operation.

In some embodiments, a computational fluid dynamics investigation has to be performed to inspect and quantify the near wellbore flow parameters and in order to identify the invaded fluid flow characteristics from the formation to the wellbore. In particular, the computational fluid dynamics analysis may be utilized to consider the interaction between the invading fluid and the existing formation fluid additionally to the fluid and solid phases interphase. In some embodiments, a near wellbore model using three-dimensional Navier-Stokes equations is utilized for analyzing the flow around the wellbore. The Navier-Stokes equations along with a near-optimal solver provide an efficient computational fluid dynamics framework for analyzing fluid flow in the wellbore and its surrounding region. Thus, Navier-Stoke equations may be incorporated in the fluid dynamics model to solve for the transient flow behavior near (for example, wellbore (120)) in the damaged zone perimeter. When the pressure drop near wellbore and the flow behavior are identified consequently, the required duration of flowback operations may be deduced by coupling the outputs of the time-dependent invasion profile with the near wellbore transient flow behavior. This operation may aid in optimizing flowback operations based on scientific basis and the cost of production/injection enhancement along with restoring the potential of the well efficiently.

Figure 4:
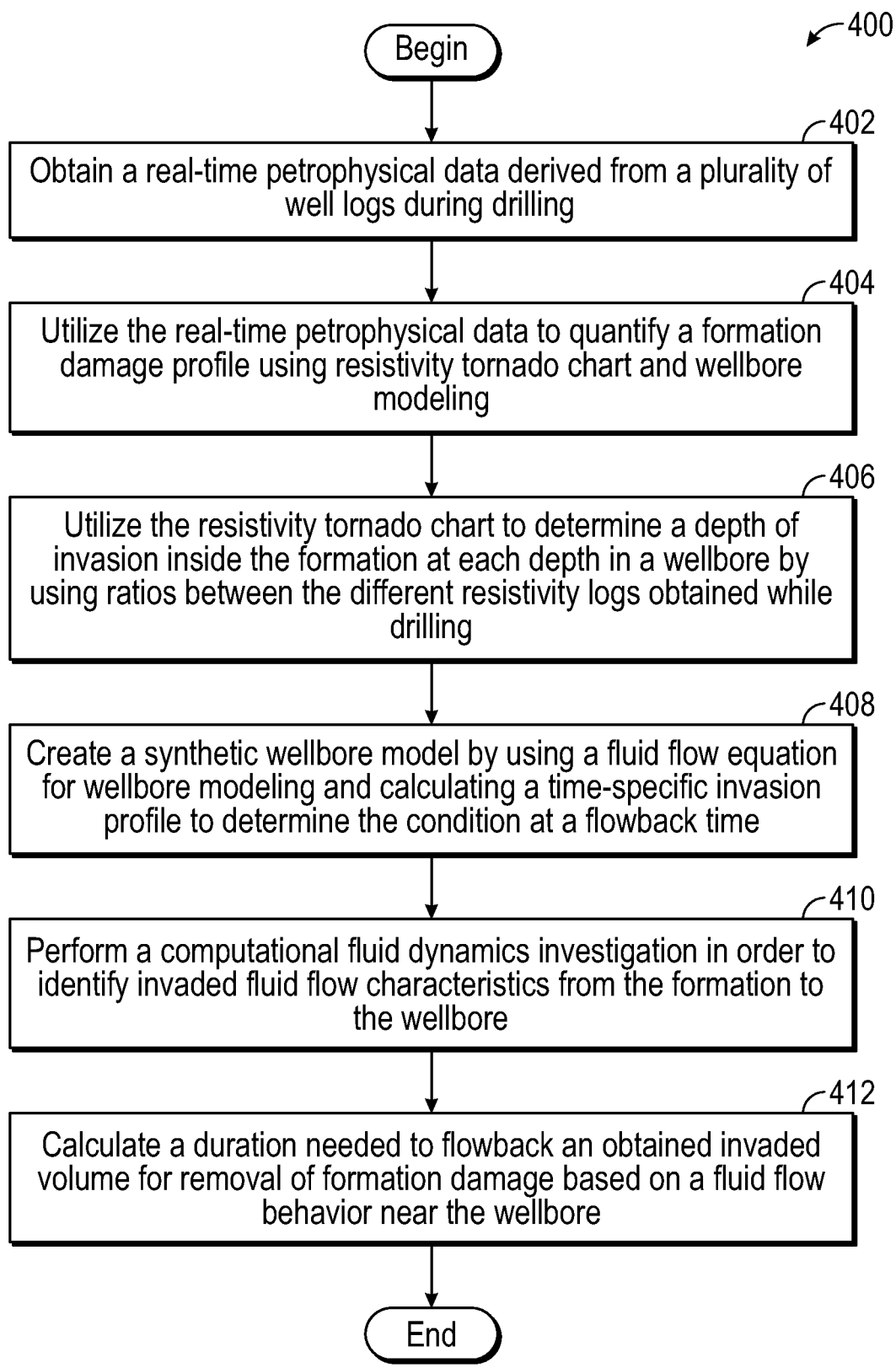
FIG. 4 shows a flowchart in accordance with one or more embodiments.

FIG. 4 shows a flowchart (400) in accordance with one or more embodiments. Specifically, FIG. 4 describes a general method for flowback operations starting from the initial screening process until computing the time needed to flow the well. One or more steps in FIG. 4 may be performed by one or more components (for example, rig (101), logging system (112), flow rate sensor (139), well-log (140), and reservoir simulator (160)) as described in FIG. 1. While the various steps in FIG. 4 are presented and described sequentially, one of ordinary skill in the art will appreciate that some or all of the steps may be executed in different orders, may be combined, or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 402, a real-time petrophysical data derived from a plurality of well logs is obtained during drilling in accordance with one or more embodiments. For example, the well control system (126) through the logging system (112) collects and records wellhead data (135) for the well system (106) and may generate datasets of dynamic data based on the collected wellhead data (135). In particular, the real-time wellhead data (135) may be obtained by the operator of the well system (106) to assess a relatively current state of the well system (106) and make real-time decisions regarding development of the well system (106) and the reservoir (102) during drilling, such as on-demand adjustments in regulation of production flow from the well described previously in FIG. 1 and the accompanying description.

In step 404, the real-time petrophysical data is utilized to quantify a formation damage profile using a resistivity tornado chart and a wellbore modeling in accordance with one or more embodiments. For example, the reservoir simulator (160) may store well logs (140) and data regarding core samples (150), and further analyze the well log data, the core sample data, seismic data, or other types of data for the wellbore modeling described previously in FIG. 1 and the accompanying description. In addition, flowback candidates are identified from the real-time petrophysical data based on reservoir management goals. In some embodiments, the flowback candidates include at least a core data, a well testing data and a fluid saturation data for data correlation and process enhancement prior to calculating a time-specific invasion profile.

In particular, when the drilling mud encounters a porous and permeable formation, the drilling mud may flow into the formation under the influence of this difference in fluid pressures and cause the invasion. However, the particulates in the mud will be left at the surface, with the rock acting as an efficient filter. Thus, there is a build-up of mud particles on the inner wall of the wellbore, and this is called a mud cake. The remaining liquid part of the drilling mud enters the formation, pushing back the reservoir fluids. This part of the drilling mud is called a mud filtrate. The zone where the mud filtrate has replaced the reservoir fluids is called a flushed zone and there is a zone further into the rock where the replacement of reservoir fluids with mud filtrate is incomplete, which is called a transition zone. The fluid saturation is a ratio of the volume of a fluid in a pore space of the rock to a total pore volume of the rock.

In step 406, the resistivity tornado chart is utilized to determine a depth of invasion inside the formation at each depth in a wellbore by using ratios between the different resistivity logs obtained while drilling in accordance with one or more embodiments. For example, the resistivity tornado chart (300) incorporated with caliper logs determines a true resistivity, a flushed zone resistivity and a diameter of invasion from the ratios of deep-, medium-, and shallow-resistivity measurements at different depths of investigation as described previously in FIG. 3 and the accompanying description.

In step 408, a synthetic wellbore model is created by using a fluid flow equation for the wellbore modeling and calculating a time-specific invasion profile to determine a condition at a flowback time in accordance with one or more embodiments. For example, the obtained value from the resistivity tornado chart (300) may be utilized as inputs to the synthetic wellbore model to estimate the time-specific invasion profile, compute the time-specific invasion profile, and ultimately compute the volume of invaded fluids at the time of flowback operation as described previously in FIG. 3 and the accompanying description.

In step 410, a computational fluid dynamics investigation is performed in order to identify the invaded fluid flow characteristics from the formation to the wellbore in accordance with one or more embodiments. In particular, the computational fluid dynamics analysis considers the interaction between the invading fluid and the existing formation fluid additionally to the fluid and solid phases interphase. For example, the computational fluid dynamics analysis is then utilized to identify invading fluid distribution knowing the contrast of solids content between mud and formation fluid while taking into consideration the precipitation of solids on wellbore wall as described previously in FIG. 3 and the accompanying description.

In step 412, a duration needed to flowback an obtained invaded volume for removal of the formation damage is calculated based on a fluid flow behavior near the wellbore in accordance with one or more embodiments. For example, when the pressure drop near the wellbore (for example, wellbore (120)) and the flow behavior are identified consequently, the required duration of flowback operations may be deduced by coupling the outputs of the time-dependent invasion profile with the near wellbore transient flow behavior. This operation may aid in optimizing flowback operations based on scientific basis and the cost of production/injection enhancement along with restoring the potential of the well efficiently as described previously in FIG. 3 and the accompanying description.

Thus, those skilled in the art will appreciate that the flow chart of FIG. 4 is constantly executing to compute the time needed to flow the well rather than focusing on the single step of utilizing resistivity inversion and fluid flow analysis, in real-time. Further, not only is the process of FIG. 4 continuous, the process shown may be repeated for multiple well logs including density-neutron porosity, permeability, and nuclear magnetic resonance (NMR) log as a vital step to determine invasion-critical zones, to indicate porosity obtained during the drilling, and understand lithological features simultaneously with resistivity logs which will contribute to understanding porosimetry and voids distribution leading to obtain the most probably depths to contains invaded fluids pockets. In this manner, the process described in the flowchart (400) does not conform to a single step of utilizing resistivity inversion and fluid flow analysis in general or conform to a one-size-fits-all type of model but may remain an independent analysis for a multi-step methodology for flowback operations.

One or more embodiments disclosed herein provide computation of the quantified formation damage to aid in flowing the well intelligently, which may allow optimization of the volume flowed back from the well, reduction of the operation duration, and/or a reduction in the overall cost involved.

Figure 5A:
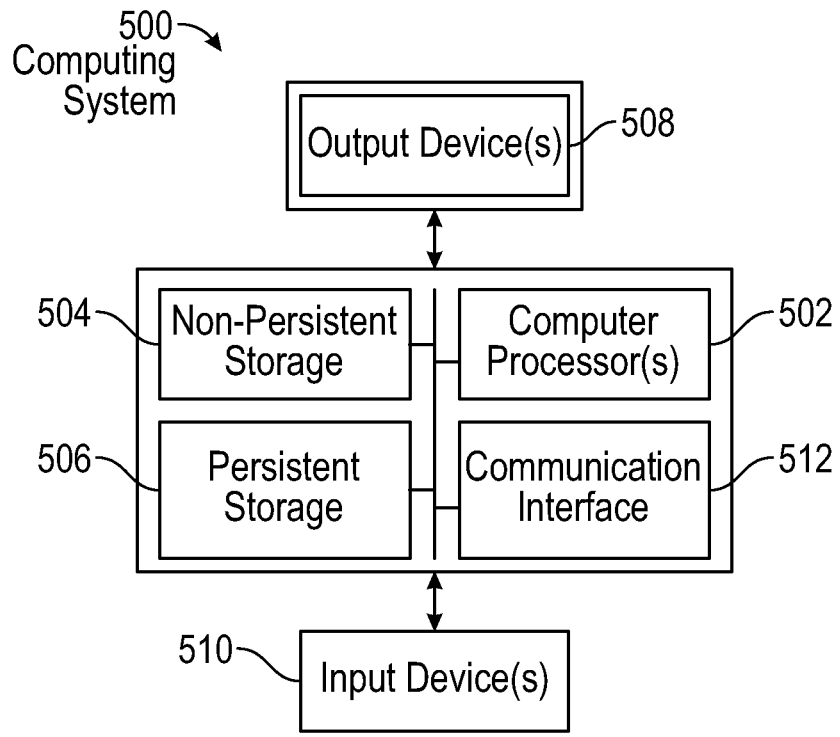
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (for example, volatile memory, such as random access memory (RAM), cache memory), persistent storage (506) (for example, a hard disk, an optical drive such as a compact disk (CD) drive or digital versatile disk (DVD) drive, a flash memory), a communication interface (512) (for example, Bluetooth interface, infrared interface, network interface, optical interface), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, or electronic pen.

The communication interface (512) may include an integrated circuit for connecting the computing system (500) to a network (not shown) (for example, a local area network (LAN), a wide area network (WAN), such as the Internet, mobile network, or any other type of network) or to another device, such as another computing device.

Further, the computing system (500) may include one or more output devices (508), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 5B:
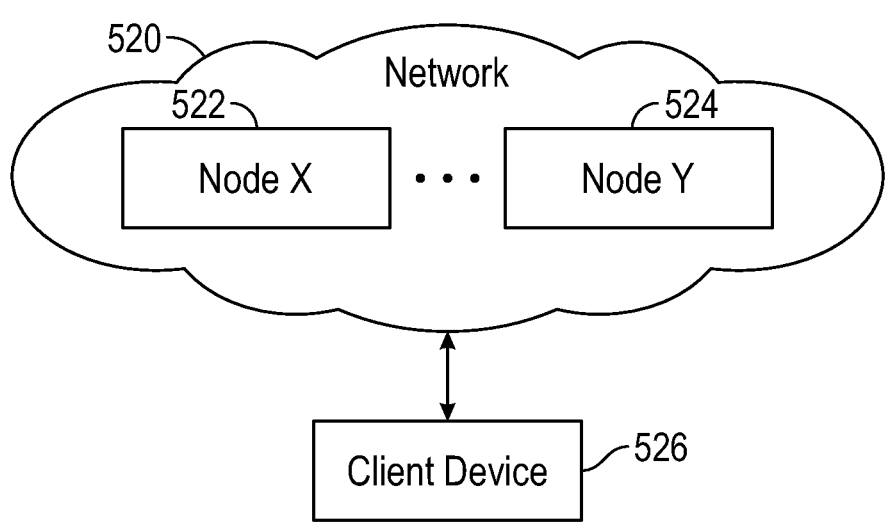

The computing system (500) in FIG. 5A may be connected to or be a part of a network. For example, as shown in FIG. 5B, the network (520) may include multiple nodes (for example, node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (for example, a process that provides data) may create a first socket object. Next, the server process binds the first socket object, thereby associating the first socket object with a unique name or address. After creating and binding the first socket object, the server process then waits and listens for incoming connection requests from one or more client processes (for example, processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (for example, bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

The computing system of FIG. 5A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

The previous description of functions presents only a few examples of functions performed by the computing system of FIG. 5A and the nodes or client device in FIG. 5B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
   obtaining, by a computer processor, a real-time petrophysical data derived from a plurality of well logs during drilling;
   utilizing, by the computer processor, the real-time petrophysical data to quantify a formation damage profile using a resistivity tornado chart and a wellbore modeling;
   utilizing, by the computer processor, the resistivity tornado chart to determine a depth of invasion inside a formation at each depth in a wellbore by using ratios between different resistivity logs obtained while drilling;
   creating, by the computer processor, a synthetic wellbore model by using a fluid flow equation for the wellbore modeling and calculating a time-specific invasion profile to determine a condition at a flowback time;
   identifying a plurality of flowback candidates from the real-time petrophysical data based on reservoir management goals, wherein the plurality of flowback candidates include a core data, a well testing data, and a fluid saturation data for data correlation and process enhancement prior to calculating the time-specific invasion profile;
   performing, by the computer processor, a computational fluid dynamics investigation in order to identify invaded fluid flow characteristics from the formation to the wellbore;
   calculating, by the computer processor, a duration needed to flowback an obtained invaded volume for removal of the formation damage based on a fluid flow behavior near the wellbore, and
   performing, based on the calculated duration, flowback of the wellbore to clean flow conduits near the wellbore and enhance performance of the wellbore.

2. The method of claim 1, further comprising inspecting the plurality of well logs for an indication of porosity obtained during the drilling.

3. The method of claim 1, further comprising inspecting differences between the different resistivity logs to localize and understand lithological features of inversion at different depths in the formation.

4. The method of claim 1, further comprising processing the plurality of well logs to deduce a density-neutron porosity, permeability, and nuclear magnetic resonance (NMR) of a near wellbore formation.

5. The method of claim 4, further comprising determining a plurality of critical zones.

6. The method of claim 1, further comprising calculating initial invasion depths based on the different resistivity logs to determine the time-specific invasion profile after immediately drilling using the resistivity tornado chart incorporated with caliper logs.

7. A system, comprising:
   a drilling system;
   a logging system comprising a plurality of drill bit logging tools, wherein the logging system is coupled to the drilling system;
   a control system coupled to a plurality of sensors; and
   a reservoir simulator comprising a computer processor, wherein the reservoir simulator is coupled to the logging system and the drilling system and comprises functionality for:
   obtaining a real-time petrophysical data derived from a plurality of well logs during drilling;

utilizing the real-time petrophysical data to quantify a formation damage profile using a resistivity tornado chart and a wellbore modeling;

utilizing the resistivity tornado chart to determine a depth of invasion inside a formation at each depth in a wellbore by using ratios between different resistivity logs obtained while drilling;

creating a synthetic wellbore model by using a fluid flow equation for the wellbore modeling and calculating a time-specific invasion profile to determine a condition at a flowback time;

identifying a plurality of flowback candidates from the real-time petrophysical data based on reservoir management goals, wherein the plurality of flowback candidates include a core data, a well testing data, and a fluid saturation data for data correlation and process enhancement prior to calculating the time-specific invasion profile;

performing a computational fluid dynamics investigation in order to identify invaded fluid flow characteristics from the formation to the wellbore;

calculating a duration needed to flowback an obtained invaded volume for removal of the formation damage based on a fluid flow behavior near the wellbore, and performing, based on the calculated duration, flowback of the wellbore to clean flow conduits near the wellbore and enhance performance of the wellbore.

8. The system of claim 7, wherein the reservoir simulator is further configured to inspect the plurality of well logs for an indication of porosity obtained during the drilling.

9. The system of claim 7, wherein the reservoir simulator is further configured to inspect differences between the different resistivity logs to localize and understand lithological features of inversion at different depths in the formation.

10. The system of claim 7, the reservoir simulator is further configured to process the plurality of well logs to deduce a density-neutron porosity, permeability, and nuclear magnetic resonance (NMR) of a near wellbore formation.

11. The system of claim 10, the reservoir simulator is further configured to determine a plurality of critical zones.

12. The system of claim 7, the reservoir simulator is further configured to calculate initial invasion depths based on the different resistivity logs to determine the time-specific invasion profile after immediately drilling using the resistivity tornado chart incorporated with caliper logs.

13. A non-transitory computer readable medium storing instructions executable by a computer processor, the instructions comprising functionality for:

obtaining a real-time petrophysical data derived from a plurality of well logs during drilling;

utilizing the real-time petrophysical data to quantify a formation damage profile using a resistivity tornado chart and a wellbore modeling;

utilizing the resistivity tornado chart to determine a depth of invasion inside a formation at each depth in a wellbore by using ratios between different resistivity logs obtained while drilling;

creating a synthetic wellbore model by using a fluid flow equation for the wellbore modeling and calculating a time-specific invasion profile to determine a condition at a flowback time;

identifying a plurality of flowback candidates from the real-time petrophysical data based on reservoir management goals, wherein the plurality of flowback candidates include a core data, a well testing data, and a fluid saturation data for data correlation and process enhancement prior to calculating the time-specific invasion profile;

performing a computational fluid dynamics investigation in order to identify invaded fluid flow characteristics from the formation to the wellbore;

calculating a duration needed to flowback an obtained invaded volume for removal of the formation damage based on a fluid flow behavior near the wellbore, and performing, based on the calculated duration, flowback of the wellbore to clean flow conduits near the wellbore and enhance performance of the wellbore.

14. The non-transitory computer readable medium of claim 13, wherein the instructions further comprise functionality for:

inspecting the plurality of well logs for an indication of porosity obtained during the drilling.

15. The non-transitory computer readable medium of claim 13, wherein the instructions further comprise functionality for:

inspecting differences between the different resistivity logs to localize and understand lithological features of inversion at different depths in the formation; and processing the plurality of well logs to deduce a density-neutron porosity, permeability, and nuclear magnetic resonance (NMR) of a near wellbore formation.

16. The non-transitory computer readable medium of claim 15, wherein the instructions further comprise functionality for:

determining a plurality of critical zones.

17. The non-transitory computer readable medium of claim 13, wherein the instructions further comprise functionality for:

calculating initial invasion depths based on the different resistivity logs to determine the time-specific invasion profile after immediately drilling using the resistivity tornado chart incorporated with caliper logs.

* * * * *